Patented Aug. 2, 1932

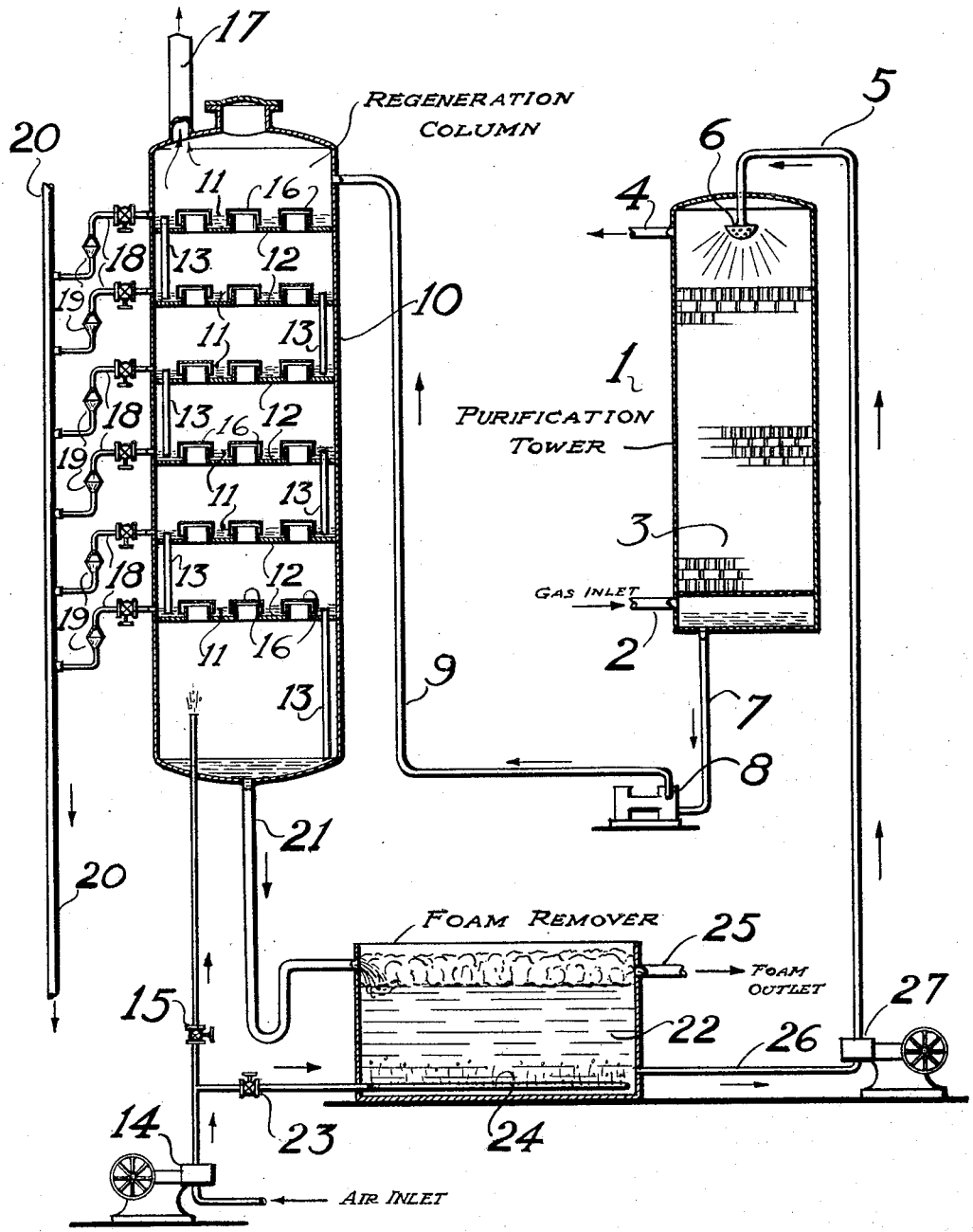

1,869,435

UNITED STATES PATENT OFFICE

HAROLD JANNEY NICHOLS, JR., AND CLARENCE R. WISE, OF ROSELLE, NEW JERSEY, ASSIGNORS TO STANDARD OIL DEVELOPMENT COMPANY, A CORPORATION OF DELAWARE

METHOD OF REGENERATING SOLUTIONS USED IN THE PURIFICATION OF HYDROCARBON GAS

Application filed July 1, 1927. Serial No. 202,829.

In carrying out certain processes for the purification of a sulphur bearing gas it is contacted with a liquor containing alkali metal carbonate and/or bicarbonate and suitable metal oxides such as ferric oxide. The metallic oxides referred to are those which react with hydrogen sulphide to form a metallic sulphide which may be converted to a metallic oxide and free sulphur by contacting with air. The used liquor is regenerated by blowing with air. During this regeneration free sulphur is formed. A foam is produced on blowing, the sulphur passes into the foam and may be eliminated by the removal thereof.

This invention comprises an improvement in methods of and apparatus for regenerating the liquor referred to after use and has for its objects the more efficient and economical regeneration thereof.

We have found that the liquor referred to may be regenerated more expeditiously and efficiently by contacting it with air in a column of the type shown on the drawing which accompanies this application. The column referred to comprises a vertically disposed columnar chamber equipped with a series of horizontal partitions. Pipes extend a fixed distance above each partition and maintain a definite layer of liquor thereon, any excess being diverted to the next lower partition. The liquor is introduced at or near the top of the column and passes from layer to layer in a general downward direction being finally withdrawn at the base. Air or other gas rich in free oxygen is introduced at the base of the column, dispersed through the lowest layer of liquor by means of suitable distributors such as bell caps and reunited in the space immediately above the liquor. This operation is repeated at each upwardly succeeding layer, the air being finally discharged at or near the top of the column.

A foam containing sulphur may be withdrawn from the column by means of suitable pipes but our preferred method is to discharge the liquor from the column into a tank and blow it with air. Foam is thereby produced containing sulphur and may be discharged in any suitable manner.

The drawing which accompanies this specification shows a vertical section of apparatus adapted to carry out the process. The drawing and method of operating same will be concurrently described. The gas to be purified is introduced to the purification tower 1 through pipe 2 and passes upwardly through the checkerwork 3 being discharged through pipe 4. In the purification tower it meets countercurrently a purifying liquor which is introduced by means of pipe 5 and spray head or distributor 6. The used liquor passes off through pipe 7 and is elevated by pump 8 discharging through pipe 9 into the regeneration column 10 in which it accumulates to form a series of layers 11 on the transverse partitions 12. A general downward flow from layer to layer takes place through pipes 13. Air is compressed by 14 discharging through valved pipe 15 into the lower part of the regeneration column. The air is dispersed through the lowest liquor layer by means of distributors 16 and reunites in the space immediately above. This operation is repeated at each upwardly succeeding layer, the used air being finally discharged through pipe 17. Foam may be drawn off from the space immediately above each liquor layer by means of the valved pipes 18 discharging through observation boxes 19 into pipe 20. The regenerated liquor from the column passes through pipe 21 into tank 22. In this tank air may be introduced by means of valved pipe 23 and distributor 24. Sulphur formed on regeneration will pass into the foam produced and may be withdrawn through pipe 25. The regenerated liquor passes through pipe 26 to pump 27 by means of which it is recirculated. It is understood that the particular apparatus shown is in illustration and not in limitation and that our invention comprehends generally the regeneration of the liquor referred to by contacting it with air in a column of the type described, either accompanied by or followed by the removal of a sulphur bearing foam.

We claim:

An improved process for regeneration of liquor resulting from the treatment of gas containing sulphurous impurities with a suspension of a metallic oxide capable of reacting with said impurities in an aqueous solution of an alkali metal salt of carbonic acid, which comprises passing the liquor successively through a series of zones, passing a gas rich in free oxygen counter-currently to the liquor successively through the zones, providing thorough contact of liquor and gas whereby a foam containing sulphur is formed, and removing the foam from the liquor in at least two of the zones.

H. JANNEY NICHOLS, Jr.
CLARENCE R. WISE.